US012628160B2

(12) United States Patent
Sha et al.

(10) Patent No.: US 12,628,160 B2
(45) Date of Patent: May 12, 2026

(54) FEEDBACK INFORMATION TRANSMISSION METHOD AND APPARATUS, BASE STATION, USER EQUIPMENT AND STORAGE MEDIUM

(71) Applicant: ZTE CORPORATION, Shenzhen (CN)

(72) Inventors: Xiubin Sha, Shenzhen (CN); Bo Dai, Shenzhen (CN); Ting Lu, Shenzhen (CN); Li Niu, Shenzhen (CN); Jie Tan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 388 days.

(21) Appl. No.: 18/552,480

(22) PCT Filed: Jan. 14, 2022

(86) PCT No.: PCT/CN2022/072021
§ 371 (c)(1),
(2) Date: Sep. 26, 2023

(87) PCT Pub. No.: WO2022/206122
PCT Pub. Date: Oct. 6, 2022

(65) Prior Publication Data
US 2024/0179706 A1 May 30, 2024

(30) Foreign Application Priority Data
Apr. 1, 2021 (CN) .......................... 202110358204.2

(51) Int. Cl.
*H04W 72/232* (2023.01)
*H04L 1/1812* (2023.01)
(Continued)

(52) U.S. Cl.
CPC ....... *H04W 72/1268* (2013.01); *H04L 1/1812* (2013.01); *H04W 72/232* (2023.01); *H04W 76/28* (2018.02)

(58) Field of Classification Search
CPC ........... H04W 72/1268; H04W 72/232; H04W 76/28; H04L 1/1812
See application file for complete search history.

(56) References Cited

U.S. PATENT DOCUMENTS

2018/0152924 A1* 5/2018 Ouchi ................... H04W 48/10
2018/0367255 A1* 12/2018 Jeon ...................... H04W 72/23
(Continued)

FOREIGN PATENT DOCUMENTS

CN        105515735 A     4/2016
CN        107078863 A     8/2017
(Continued)

OTHER PUBLICATIONS

International Search Report in Application No. PCT/CN2022/072021, dated Apr. 11, 2022, 6 pages, including translation.
(Continued)

*Primary Examiner* — Kent Krueger
(74) *Attorney, Agent, or Firm* — Morgan, Lewis & Bockius LLP

(57) ABSTRACT

Provided are a feedback information transmission method and apparatus, a base station, a user equipment and a storage medium. The method includes sending a setting parameter of a physical downlink control channel (PDCCH) search space; sending a scheduled dedicated uplink resource grant or a scheduled dedicated downlink resource grant through the PDCCH search space; and in response to receiving a physical uplink shared channel (PUSCH) of a user equipment (UE), sending a PUSCH feedback indication to the UE
(Continued)

eNB

UE

Number of continuous repeated transmissions (PUSCH Repetition Bundling) of the PUSCH Maximum number (PUSCH Repetition Number) of transmission repetitions of the PUSCH DTX in the repeated transmission process of the PUSCH (PUSCH Repetition DTX)

PDCCH for UL grant

PDCCH HARQ ACK

PUSCH transmission

Stopped PUSCH transmission through the PDCCH search space so that the UE stops sending the remaining repetition number of the PUSCH.

14 Claims, 10 Drawing Sheets

(51) Int. Cl.
    *H04W 72/1268*     (2023.01)
    *H04W 76/28*     (2018.01)

(56)           References Cited

U.S. PATENT DOCUMENTS

| | | | |
|---|---|---|---|
| 2020/0014572 A1 | 1/2020 | Wong et al. | |
| 2022/0104224 A1* | 3/2022 | Choi | ..................... H04L 5/0094 |
| 2023/0180297 A1* | 6/2023 | Shin | ................. H04W 74/0833 |
| | | | 370/329 |

FOREIGN PATENT DOCUMENTS

| | | | |
|---|---|---|---|
| CN | 109314852 A | 2/2019 | |
| CN | 110463112 A | 11/2019 | |
| CN | 111373680 A | 7/2020 | |
| WO | WO-2020089869 A1 | 5/2020 | |

OTHER PUBLICATIONS

Lenovo, "Discussion on UL HARQ-ACK feedback", R1-1717439, 3GPP TSG RAN WG1 Meeting #90bis, Sep. 28, 2017, 6 pages.

* cited by examiner eNB

UE

| | | | |
|---|---|---|---|
| PDCCH for UL grant | | PUSCH transmission | |
| PDCCH HARQ ACK | | Stopped PUSCH transmission | | eNB

UE

| | | | |
|---|---|---|---|
| PDCCH for UL grant | | PUSCH transmission | |
| PDCCH HARQ ACK | | | |

First USS gap (USS GAP 1st)

eNB

UE

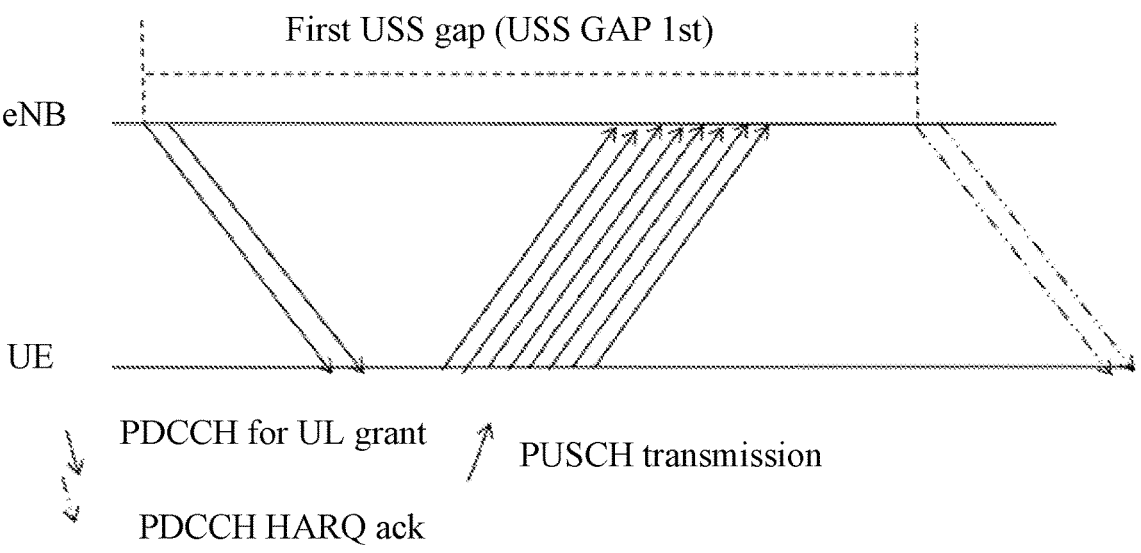

⟍ PDCCH for UL grant　　↗ PUSCH transmission

↙ PDCCH HARQ ack

FIG. 3

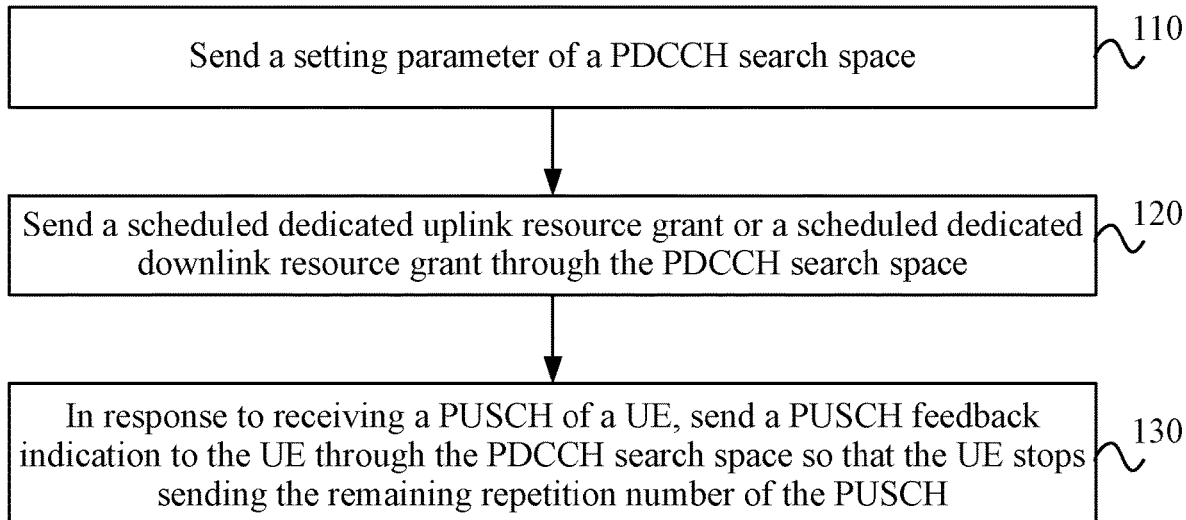

Send a setting parameter of a PDCCH search space　～110

Send a scheduled dedicated uplink resource grant or a scheduled dedicated downlink resource grant through the PDCCH search space　～120

In response to receiving a PUSCH of a UE, send a PUSCH feedback indication to the UE through the PDCCH search space so that the UE stops sending the remaining repetition number of the PUSCH　～130

FIG. 4

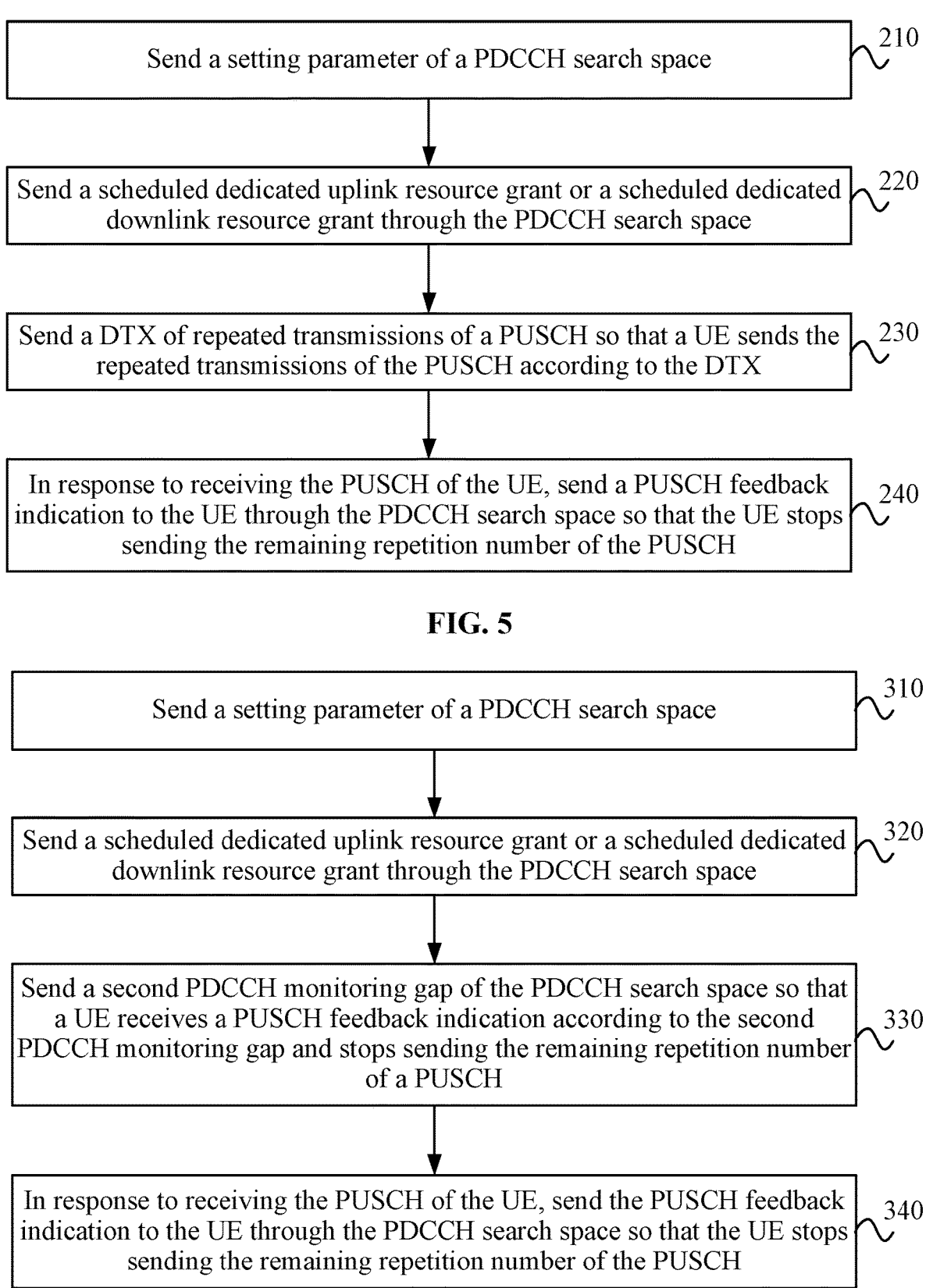

Send a setting parameter of a PDCCH search space ⟶ 210

Send a scheduled dedicated uplink resource grant or a scheduled dedicated downlink resource grant through the PDCCH search space ⟶ 220

Send a DTX of repeated transmissions of a PUSCH so that a UE sends the repeated transmissions of the PUSCH according to the DTX ⟶ 230

In response to receiving the PUSCH of the UE, send a PUSCH feedback indication to the UE through the PDCCH search space so that the UE stops sending the remaining repetition number of the PUSCH ⟶ 240

FIG. 5

Send a setting parameter of a PDCCH search space ⟶ 310

Send a scheduled dedicated uplink resource grant or a scheduled dedicated downlink resource grant through the PDCCH search space ⟶ 320

Send a second PDCCH monitoring gap of the PDCCH search space so that a UE receives a PUSCH feedback indication according to the second PDCCH monitoring gap and stops sending the remaining repetition number of a PUSCH ⟶ 330

In response to receiving the PUSCH of the UE, send the PUSCH feedback indication to the UE through the PDCCH search space so that the UE stops sending the remaining repetition number of the PUSCH ⟶ 340

FIG. 6

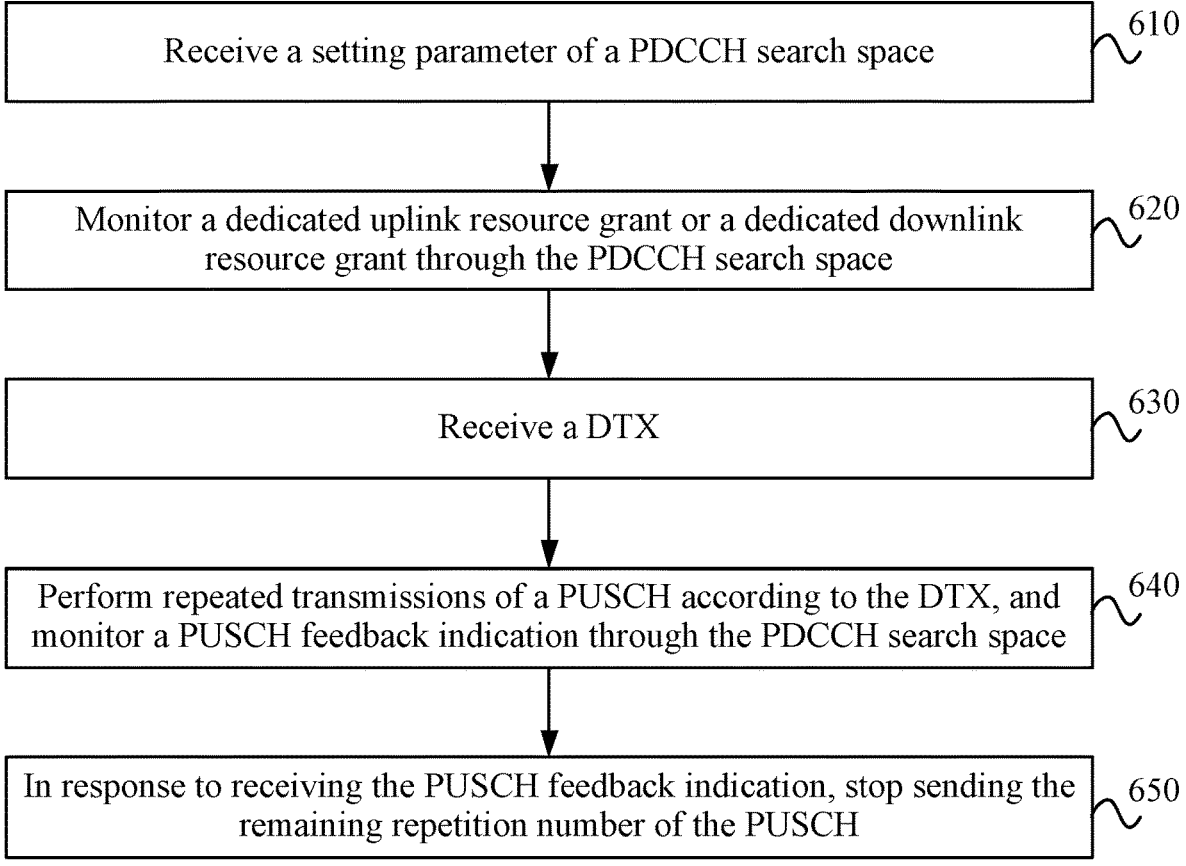

Receive a setting parameter of a PDCCH search space 610

Monitor a dedicated uplink resource grant or a dedicated downlink resource grant through the PDCCH search space 620

Receive a DTX 630

Perform repeated transmissions of a PUSCH according to the DTX, and monitor a PUSCH feedback indication through the PDCCH search space 640

In response to receiving the PUSCH feedback indication, stop sending the remaining repetition number of the PUSCH 650

FIG. 9

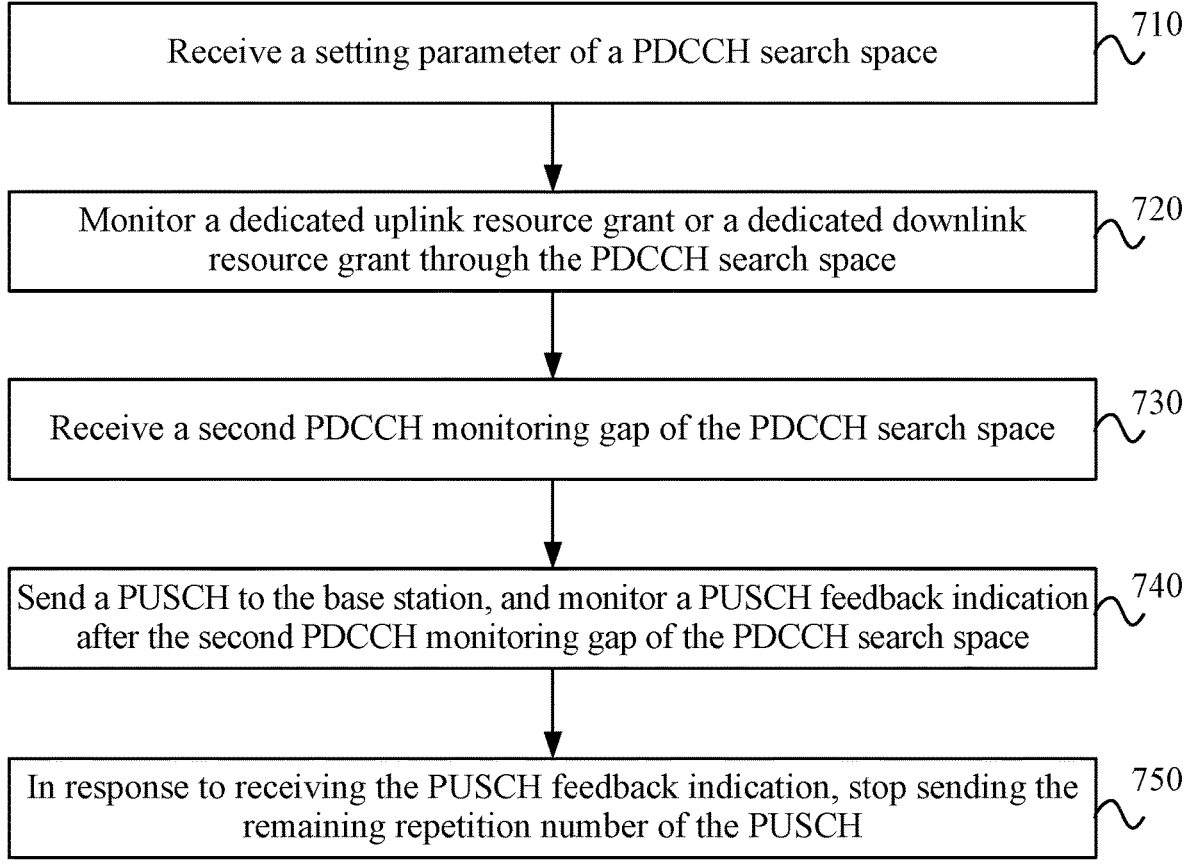

Receive a setting parameter of a PDCCH search space    710

Monitor a dedicated uplink resource grant or a dedicated downlink resource grant through the PDCCH search space    720

Receive a second PDCCH monitoring gap of the PDCCH search space    730

Send a PUSCH to the base station, and monitor a PUSCH feedback indication after the second PDCCH monitoring gap of the PDCCH search space    740

In response to receiving the PUSCH feedback indication, stop sending the remaining repetition number of the PUSCH    750

FIG. 10

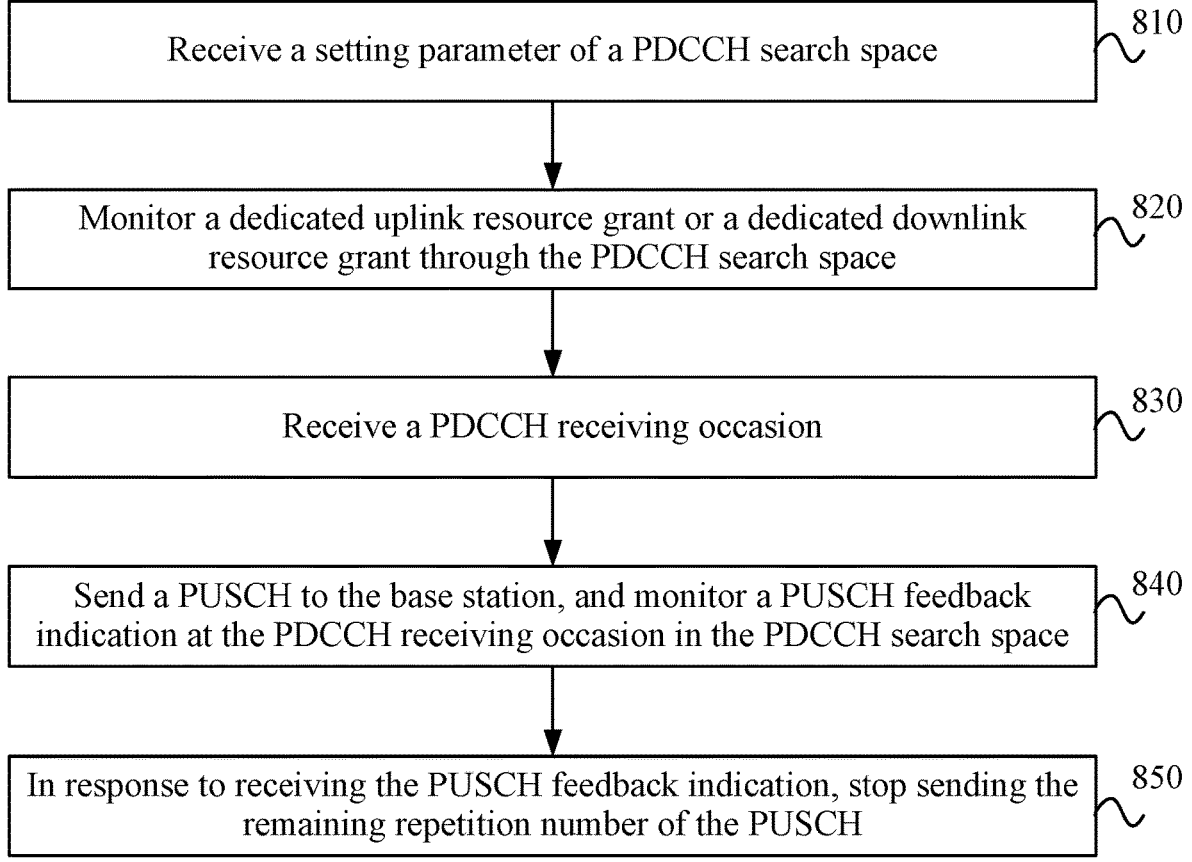

Receive a setting parameter of a PDCCH search space 〜810

Monitor a dedicated uplink resource grant or a dedicated downlink resource grant through the PDCCH search space 〜820

Receive a PDCCH receiving occasion 〜830

Send a PUSCH to the base station, and monitor a PUSCH feedback indication at the PDCCH receiving occasion in the PDCCH search space 〜840

In response to receiving the PUSCH feedback indication, stop sending the remaining repetition number of the PUSCH 〜850

FIG. 11

FEEDBACK INFORMATION TRANSMISSION METHOD AND APPARATUS, BASE STATION, USER EQUIPMENT AND STORAGE MEDIUM

CROSS REFERENCE TO RELATED APPLICATIONS

This is a National Stage Application, filed under 35 U.S.C. 371, of International Patent Application No. PCT/CN2022/072021, filed on Jan. 14, 2022, which claims priority to Chinese Patent Application No. 202110358204.2 filed with the China National Intellectual Property Administration (CNIPA) on Apr. 1, 2021, the disclosures of which are incorporated herein by reference in their entireties.

TECHNICAL FIELD

The present application relates to the field of wireless communication technology, for example, a feedback information transmission method and apparatus, a base station, a user equipment and a storage medium.

BACKGROUND

Since an enhanced machine type communication (eMTC) user equipment (UE) has relatively high energy-saving requirements, and power consumption of an uplink transmission process of the user equipment is much higher than that of a downlink receiving process of the UE, for example, when the power consumption of the cellular Internet of things (CIoT) is evaluated, the sending power consumption of the UE is about six times as high as the receiving power consumption of the UE, to save the power consumption of the transmission process of the UE, a physical downlink control channel-based hybrid automatic repeat request acknowledgment (PDCCH based HARQ ACK) function is introduced in the eMTC specification. This function is applicable to coverage enhancement scenarios. If a base station receives a physical uplink shared channel (PUSCH) in advance, the base station sends a physical downlink control channel (PDCCH) hybrid automatic repeat request acknowledgment (HARQ ACK) indication to the UE so as to prematurely end the transmission of the PUSCH of the UE, thereby saving the wireless resources and reducing the power consumption of the UE.

However, in non-terrestrial networks (NTN), due to a relatively large transmission delay and a relatively large monitoring gap set for a PDCCH, the arrival time of the PDCCH HARQ ACK indication sent by the base station to the UE is always behind the completion time of the transmission of the PUSCH in the UE, and the PDCCH based HARQ ACK function fails to prematurely end the transmission of the PUSCH. As a result, the wireless resources cannot be saved, and the power consumption of the UE cannot be reduced.

SUMMARY

Embodiments of the present application provide a feedback information transmission method and apparatus, a base station, a user equipment and a storage medium so that in a non-terrestrial network, a physical downlink control channel-based hybrid automatic repeat request acknowledgment function can be implemented, the repeated transmissions of a physical uplink shared channel can be stopped in advance, and the power consumption of a user equipment in the wireless communication process can be reduced.

Embodiments of the present application provide a feedback information transmission method. The method includes the following: A setting parameter of a physical downlink control channel (PDCCH) search space is sent; a scheduled dedicated uplink resource grant or a scheduled dedicated downlink resource grant is sent through the PDCCH search space; and in response to receiving a physical uplink shared channel (PUSCH) of a user equipment (UE), a PUSCH feedback indication is sent to the UE through the PDCCH search space so that the UE stops sending the remaining repetition number of the PUSCH.

Embodiments of the present application further provide a feedback information transmission method. The method includes the following: A setting parameter of a physical downlink control channel (PDCCH) search space is received; a dedicated uplink resource grant or a dedicated downlink resource grant is monitored through the PDCCH search space; a physical uplink shared channel (PUSCH) is sent to a base station, and a PUSCH feedback indication is monitored through the PDCCH search space; and in response to receiving the PUSCH feedback indication, sending of the remaining repetition number of the PUSCH is stopped.

Embodiments of the present application further provide a feedback information transmission apparatus. The apparatus includes a configuration sending module, a resource scheduling module and a channel receiving module. The configuration sending module is configured to send a setting parameter of a physical downlink control channel (PDCCH) search space.

The resource scheduling module is configured to send a scheduled dedicated uplink resource grant or a scheduled dedicated downlink resource grant through the PDCCH search space.

The channel receiving module is configured to, in response to receiving a physical uplink shared channel (PUSCH) of a user equipment (UE), send a PUSCH feedback indication to the UE through the PDCCH search space so that the UE stops sending the remaining repetition number of the PUSCH.

Embodiments of the present application further provide a feedback information transmission apparatus. The apparatus includes a configuration receiving module, a resource monitoring module, an indication monitoring module and a channel control module.

The configuration receiving module is configured to receive a setting parameter of a physical downlink control channel (PDCCH) search space.

The resource monitoring module is configured to monitor a dedicated uplink resource grant or a dedicated downlink resource grant through the PDCCH search space.

The indication monitoring module is configured to send a physical uplink shared channel (PUSCH) to a base station, and monitor a PUSCH feedback indication through the PDCCH search space.

The channel control module is configured to, in response to receiving the PUSCH feedback indication, stop sending the remaining repetition number of repetitions of the PUSCH.

Embodiments of the present application further provide a base station. The base station includes one or more processors and a memory configured to store one or more programs. When executed by the one or more processors, the one or more programs cause the one or more processors to perform the feedback information transmission method according to any embodiment of the present application.

Embodiments of the present application further provide a user equipment. The user equipment includes one or more processors and a memory configured to store one or more programs. When executed by the one or more processors, the one or more programs cause the one or more processors to perform the feedback information transmission method according to any embodiment of the present application.

Embodiments of the present application further provide a computer-readable storage medium storing a computer program which, when executed by a processor, causes the processor to perform the feedback information transmission method according to any embodiment of the present application.

In the embodiments of the present application, the setting parameter of the PDCCH search space is sent to the UE, the scheduled dedicated uplink resource grant or the scheduled dedicated downlink resource grant is sent according to the PDCCH search space, and when the PUSCH is received, the PUSCH feedback indication is sent to the user equipment through the PDCCH search space so that the user equipment can stop sending of the remaining repetition number of the PUSCH, the non-terrestrial networks can support the hybrid automatic repeat request acknowledgment function, and the remaining repetition number of the physical uplink shared channel of the user equipment can be stopped in advance, thereby reducing the energy overhead of the user equipment.

BRIEF DESCRIPTION OF DRAWINGS

FIG. 3 is an example diagram illustrating how a monitoring gap is applied to a feedback information transmission method according to an embodiment of the present application.

FIG. 4 is a flowchart of a feedback information transmission method according to an embodiment of the present application.

FIG. 5 is a flowchart of another feedback information transmission method according to an embodiment of the present application.

FIG. 6 is a flowchart of another feedback information transmission method according to an embodiment of the present application.

FIG. 9 is a flowchart of another feedback information transmission method according to an embodiment of the present application.

FIG. 10 is a flowchart of another feedback information transmission method according to an embodiment of the present application.

FIG. 11 is a flowchart of another feedback information transmission method according to an embodiment of the present application.

DETAILED DESCRIPTION

It is to be understood that the specific embodiments described herein are intended to explain the present application and not to limit the present application.

Suffixes such as "module", "part", or "unit" used to indicate elements in the subsequent description are merely used to facilitate the description of the present application and have no particular meaning in themselves. Therefore, "module", "part", or "unit" may be used in a mixed manner.

Figure 1:
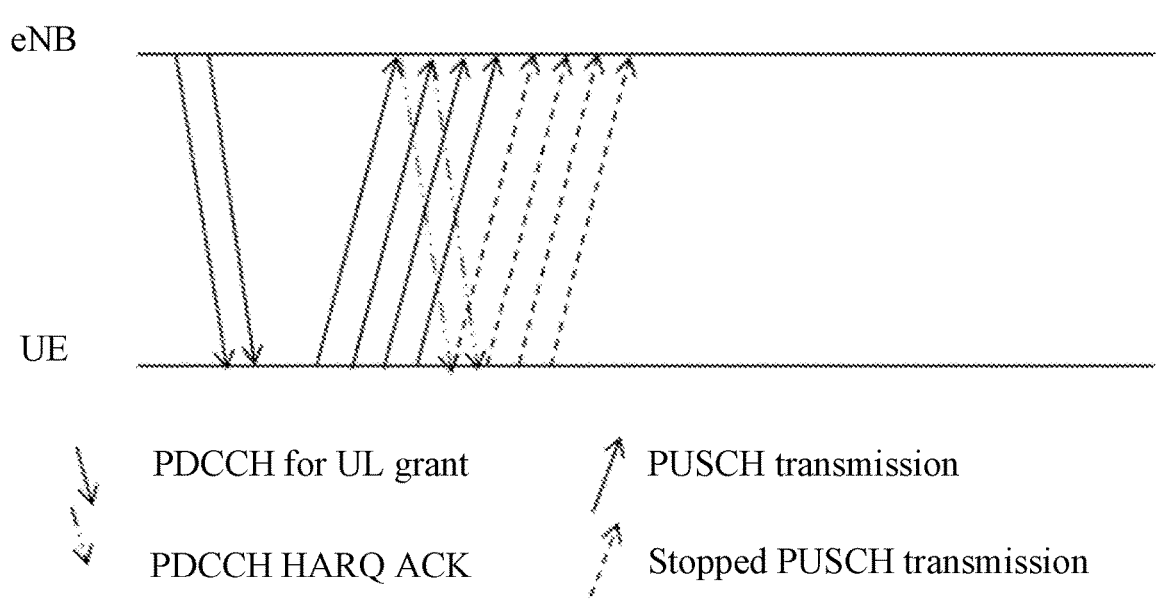
FIG. 1 is an example diagram illustrating a traditional feedback information transmission method according to an embodiment of the present application.
Figure 2:
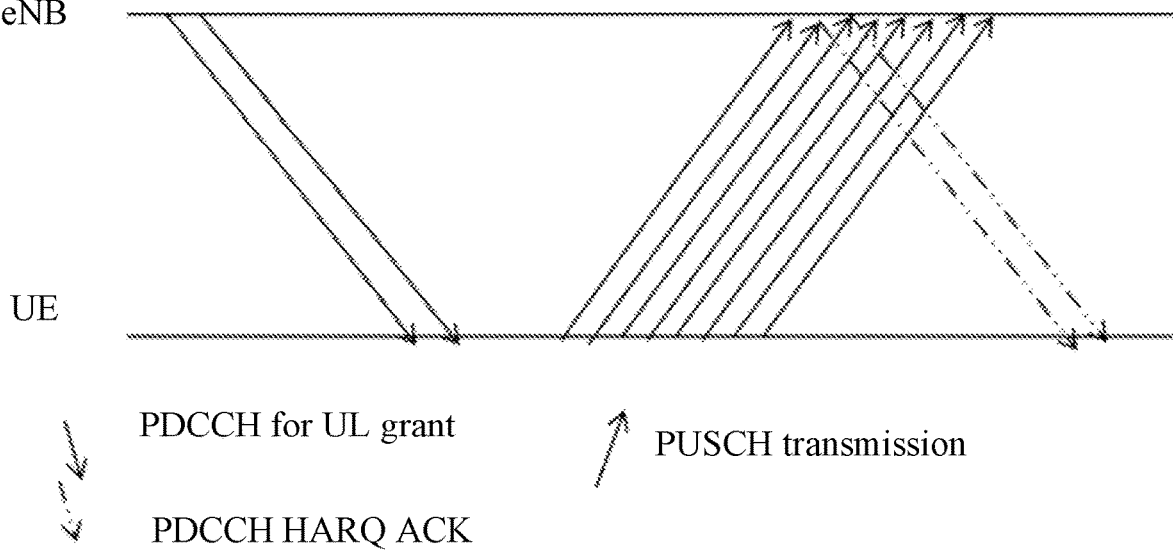
FIG. 2 is an example diagram illustrating how a transmission delay affects a feedback information transmission method according to an embodiment of the present application.

The PDCCH based HARQ ACK function is introduced in the eMTC specification and is used in coverage enhancement communication network scenarios. If receiving the PUSCH in advance, the base station sends a PDCCH HARQ ACK indication to a user equipment (UE) to stop the transmission of the PUSCH in advance so as to save wireless resources and reduce the power consumption of the UE. Referring to FIG. 1, in the common PDCCH based HARQ ACK function, after the PUSCH is decoded by a base station (eNB), and the eNB sends a PDCCH HARQ ACK to the UE, the UE stops transmitting the subsequent repetition number of the PUSCH. However, in the non-terrestrial networks, referring to FIGS. 2 and 3, due to a relatively large transmission delay and a relatively large monitoring gap configured for the PDCCH, the PDCCH HARQ ACK cannot arrive at the UE in time so that the UE cannot stop transmitting the remaining repetition number in time.

FIG. 4 is a flowchart of a feedback information transmission method according to an embodiment of the present application. This embodiment of the present application is applicable to the case where the PDCCH based HARQ ACK function is supported by the non-terrestrial networks and is also applicable to the case where a half-duplex UE supports the PDCCH based HARQ ACK function. The method may be executed by a feedback information transmission apparatus according to an embodiment of the present, and the apparatus is generally integrated in a base station. Referring to FIG. 4, the method according to this embodiment of the present application includes the following:

In S110, a setting parameter of a PDCCH search space is sent.

The physical downlink control channel (PDCCH) search space may be a search space in which the UE receives the PDCCH so that the UE may stop sending the remaining repetition number of the PUSCH. The setting parameter may be a parameter for configuring the PDCCH search space and may include the start position of the search space, the end position of the search space, and others.

In this embodiment of the present application, the base station may send the setting parameter of the PDCCH search space to the UE so that the UE may determine the PDCCH search space according to the setting parameter, and the PDCCH search space may be determined by the base station according to high-layer signaling, or the content defined in the specification.

In S120, a scheduled dedicated uplink resource grant or a scheduled dedicated downlink resource grant is sent through the PDCCH search space.

For example, the base station sends the scheduled dedicated uplink resource grant or the scheduled dedicated downlink resource grant through the PDCCH.

In S130, in response to receiving a physical uplink shared channel (PUSCH) of a UE, a PUSCH feedback indication is sent to the UE through the PDCCH search space so that the UE may stop sending the remaining repetition number of the PUSCH.

The PUSCH feedback indication may be feedback information representing that the PUSCH is successfully received, and the PUSCH feedback indication may be used for stopping sending the remaining repetition number of the PUSCH in the UE.

For example, when receiving the PUSCH, the base station may send the PUSCH feedback indication to the UE according to the PDCCH search space so that the UE may acquire the PUSCH feedback indication before the sending of the PUSCH is completed and stop sending of the remaining repetition number of the PUSCH in advance, thus reducing the sending power consumption of the UE.

In this embodiment of the present application, the setting parameter of the PDCCH search space is sent to the UE, the scheduled dedicated uplink resource grant or the scheduled dedicated downlink resource grant is sent in the PDCCH search space, and when the PUSCH is received, the PUSCH feedback indication is sent to the user equipment through the PDCCH search space so that the user equipment may stop sending of the remaining repetition number of the PUSCH, the non-terrestrial networks can support the hybrid automatic repeat request acknowledgment function, and the remaining repetition number of the physical uplink shared channel transmitted by the user equipment can be stopped in advance, thereby reducing the energy overhead of the user equipment.

FIG. 5 is a flowchart of another feedback information transmission method according to an embodiment of the present application. This embodiment of the present application is an embodiment based on the preceding embodiment of the present application. Referring to FIG. 5, the method according to this embodiment of the present application includes the following:

In S210, the setting parameter of the PDCCH is sent.

In S220, the scheduled dedicated uplink resource grant or the scheduled dedicated downlink resource grant is sent through the PDCCH search space.

In S230, a discontinuous transmission parameter (DTX) of repeated transmissions of the PUSCH is sent so that a UE may send the repetition transmission of the PUSCH according to the DTX.

The discontinuous transmission parameter (DTX) may be a gap that controls the PUSCH to discontinuously perform the repeated transmissions, and the gap for each repeated transmission of the PUSCH may be determined by the DTX.

In this embodiment of the present application, the DTX is configured for the transmission of the PUSCH and sent to the UE so that the UE sends the PUSCH according to the configured DTX, and the UE may acquire feedback information from the base station before sending of all the number of repetitions of the PUSCH is completed, thereby reducing the sending power consumption of the UE. For example, when the PUSCH is repeatedly transmitted n times, the length of the DTX is spaced, and when the PUSCH is repeatedly sent n times again, the length of the DTX is spaced again. The entire sending process of the PUSCH may repeat the preceding process.

In S240, in response to receiving the PUSCH of the UE, a PUSCH feedback indication is sent to the UE through the PDCCH search space so that the UE may stop sending the remaining repetition number of the PUSCH.

In an embodiment, based on the preceding embodiments of the present application, the DTX includes at least one of the following: the number of times of each repeated transmission of the PUSCH of the UE, the division number of repeated transmissions of the PUSCH of the UE, or the length of the DTX.

For example, the number of times of each repeated transmission of the PUSCH of the UE or the division number of repeated transmissions of the PUSCH of the UE may divide the repetition sending number of the PUSCH according to an integer number (after the division, the number of repetitions of the PUSCH transmitted each time is an integer factor of the maximum number of transmission repetitions of the PUSCH). Therefore, the repetition sending number may be completely divided into multiple parts by the DTX so that the repetition sending number corresponding to each repeated transmission when the PUSCH is sent may be obtained.

In this embodiment of the present application, the DTX may be the transmission number of each repeated transmission of the PUSCH. For example, the maximum number of transmission repetitions of the PUSCH is 16, the transmission number of each repeated transmission of the PUSCH is 4, the length of the DTX is set to 2 subframes, each sending of the PUSCH may be repeated 4 times, then a gap (2 subframes) is spaced, the sending is repeated 4 times again, then the gap is spaced, and the sending is repeated 4 times again. The sending of the PUSCH is completed through the preceding process. The DTX may be configured to be the transmission number of each repeated transmission of the PUSCH. The transmission number may be the required number of repetitions when the PUSCH is transmitted each time. The division number may be the number into which the maximum number of repetitions of the PUSCH is divided, and among the division number, the number of transmission repetitions for each division may be the same or may be different. For example, the maximum number of repetitions of the PUSCH is 2 that may be divided into the division number of 1 and the division number of 2, and when the PUSCH is sent, if the division number is 2, the number of each repeated transmission of the PUSCH is 1, the PUSCH is sent once, a gap is spaced, and the PUSCH is sent again; or if the division number is 1, the UE repeatedly sends the PUSCH twice.

FIG. 6 is a flowchart of another feedback information transmission method according to an embodiment of the present application. This embodiment of the present application is an embodiment based on the preceding embodiments of the present application. Referring to FIG. 6, the method according to this embodiment of the present application includes the following:

In S310, the setting parameter of the PDCCH is sent.

In an embodiment, the setting parameter of the PDCCH search space may include a monitoring gap-related parameter and a start position parameter for monitoring the PDCCH.

In S320, the scheduled dedicated uplink resource grant or the scheduled dedicated downlink resource grant is sent through the PDCCH search space.

In S330, a second PDCCH monitoring gap of the PDCCH search space is sent so that the UE may receive a PUSCH feedback indication according to the second PDCCH monitoring gap and stop sending the remaining repetition number of the PUSCH.

The second PDCCH monitoring gap may be a gap in the PDCCH search space and may enable the UE to acquire the PDCCH in advance and to stop sending the remaining repetition number of the PUSCH in advance.

In this embodiment of the present application, the base station may configure a second PDCCH monitoring gap of the PDCCH search space, and the second PDCCH monitoring gap may be defined by the standard protocols or indicated through the high-layer signaling. The second PDCCH monitoring gap may be sent to the UE so that the UE does not receive the PDCCH in the second PDCCH monitoring gap so as to reduce the presence of the case where the UE cannot acquire feedback from the base station in time due to an excessively large monitoring gap configured for the PDCCH.

In S340, in response to receiving a PUSCH of a UE, a PUSCH feedback indication is sent to the UE through the PDCCH search space so that the UE may stop sending the remaining repetition number of the PUSCH.

In an embodiment, based on the preceding embodiments of the present application, the second PDCCH monitoring gap has the same time-domain start position as a first PDCCH monitoring gap of the PDCCH search space and is less than the first PDCCH monitoring gap.

For example, the first PDCCH monitoring gap may be the monitoring gap of the PDCCH search space in the related art, the first PDCCH monitoring gap has the same time-domain start position as the second PDCCH monitoring gap, and the first PDCCH monitoring gap is greater than the second PDCCH monitoring gap.

For example, the first PDCCH monitoring gap may be the monitoring gap-related parameter in the setting parameter of the PDCCH search space.

In an embodiment, based on the preceding embodiments of the present application, the first PDCCH monitoring gap is an integer multiple of the second PDCCH monitoring gap.

For example, the first PDCCH monitoring gap may be an integer multiple of the second PDCCH monitoring gap to facilitate the alignment of the second PDCCH monitoring gap with the PDCCH search space.

Figure 7:
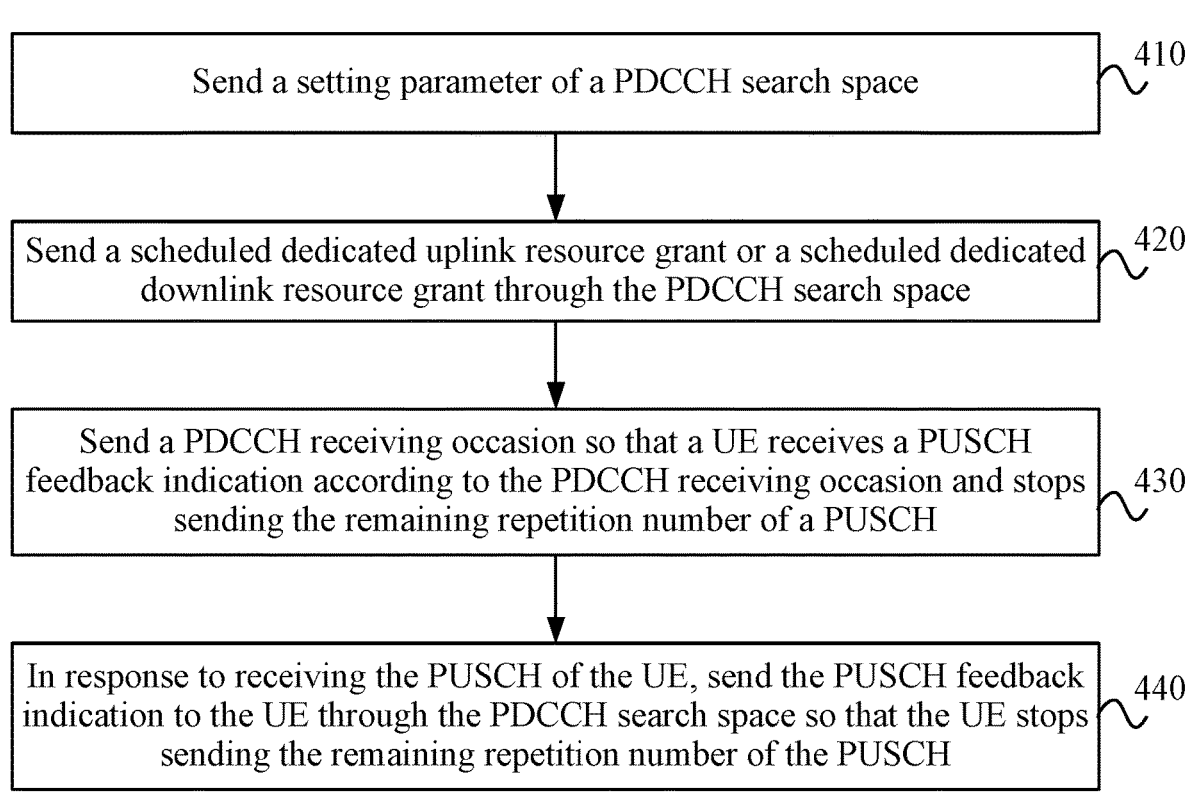
FIG. 7 is a flowchart of another feedback information transmission method according to an embodiment of the present application.

FIG. 7 is a flowchart of another feedback information transmission method according to an embodiment of the present application. This embodiment of the present application is an embodiment based on the preceding embodiments of the present application. Referring to FIG. 7, the method according to this embodiment of the present application includes the following:

In S410, the setting parameter of the PDCCH is sent.

In S420, the scheduled dedicated uplink resource grant or the scheduled dedicated downlink resource grant is sent through the PDCCH search space.

In S430, a PDCCH receiving occasion is sent so that a UE may receive a PUSCH feedback indication according to the PDCCH receiving occasion and stop sending the remaining repetition number of the PUSCH.

The PDCCH receiving occasion may be an occasion at which the UE receives the feedback information from the base station, and the PDCCH receiving occasion may be determined by the base station according to the occasion at which the PUSCH is received. For example, the PDCCH receiving occasion may also be predefined by the specification, and the base station determines the PDCCH receiving occasion based on the predefined rules in the specification. The PDCCH receiving occasion may be targeted at each repeated transmission of the PUSCH or the entire transmission of the PUSCH.

For example, the base station may determine the PDCCH receiving occasion of the PDCCH search space and send the PDCCH receiving occasion to the UE so that the UE may receive the PUSCH feedback indication according to the PDCCH receiving occasion and stop sending the remaining repetition number of the PUSCH.

In S440, in response to receiving a PUSCH of the UE, a PUSCH feedback indication is sent to the UE through the PDCCH search space so that the UE may stop sending the remaining repetition number of the PUSCH.

In an embodiment, based on the preceding embodiments of the present application, the PDCCH receiving occasion is located at a position which is offset backward by a threshold time length from the end position of the continuous repeated transmission of the PUSCH of the UE.

In this embodiment of the present application, the PDCCH receiving occasion may be at the position which is offset backward by a threshold time length from the end position of the continuous repeated transmission of the PUSCH of the UE, and the value of the threshold time length may be indicated through the high-layer signaling or may be preset.

In an embodiment, based on the preceding embodiments of the present application, the PDCCH receiving occasion is located at a position which is offset backward by the time length of a hybrid automatic repeat request (HARQ) round-trip time (RTT) timer (such as an uplink (UL) HARQ RTT timer) from the end position of the continuous repeated transmission of the PUSCH of the UE.

For example, the PDCCH receiving occasion is the position which is offset backward by a time length from the end position of the continuous repeated transmission of the PUSCH of the UE, and the time length is the length of the UL HARQ RTT timer.

Figure 8:
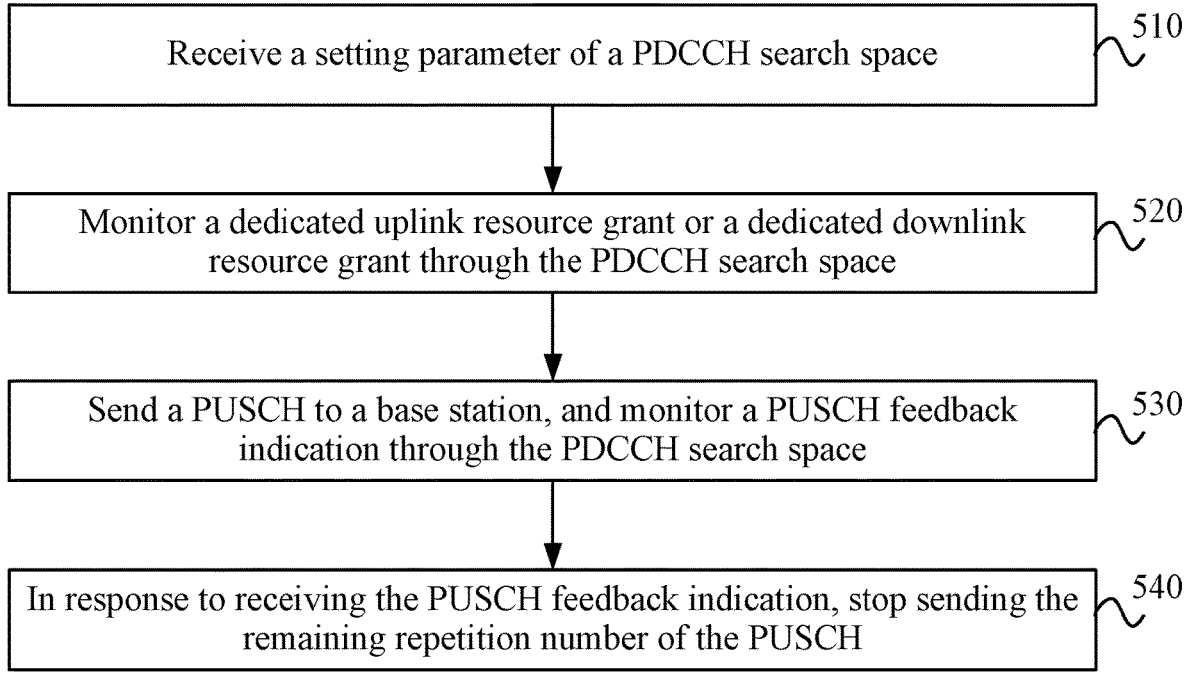
FIG. 8 is a flowchart of a feedback information transmission method according to an embodiment of the present application.

FIG. 8 is a flowchart of a feedback information transmission method according to an embodiment of the present application. This embodiment of the present application is applicable to the case where the PDCCH based HARQ ACK function is supported by the non-terrestrial networks and is also applicable to the case where a half-duplex UE supports the PDCCH based HARQ ACK function. The method is executable by a feedback information transmission apparatus according to an embodiment of the present, and the apparatus is generally integrated in the UE. Referring to FIG. 8, the method according to this embodiment of the present application includes the following:

In S510, a setting parameter of a PDCCH is received.

In this embodiment of the present application, a UE may receive the setting parameter of the PDCCH search space sent by the base station, the setting parameter may be determined by the content in standard protocols or indicated through the high-layer signaling, and after receiving the setting parameter, the user equipment may determine the position of the PDCCH search space according to the setting parameter.

In S520, a dedicated uplink resource grant or a dedicated downlink resource grant is monitored through the PDCCH search space.

For example, the UE may determine the position of the PDCCH search space according to the setting parameter and monitor the dedicated uplink resource grant or the dedicated downlink resource grant according to the PDCCH search space.

In S530, a PUSCH is sent to a base station, and a PUSCH feedback indication is monitored through the PDCCH search space.

In this embodiment of the present application, the user equipment sends the PUSCH to the base station in a repeated transmission manner and monitors the PUSCH feedback indication in the PDCCH search space after continuous repetitions are sent each time.

In S540, in response to receiving the PUSCH feedback indication, sending of the remaining repetition number of the PUSCH is stopped.

For example, when receiving the PUSCH feedback indication sent by the base station, the user equipment may stop sending the remaining repetition number of the PUSCH, thereby saving the power consumption of the UE.

In this embodiment of the present application, the setting parameter of the PDCCH search space sent by the base station is received, the dedicated uplink resource grant or the dedicated downlink resource grant is monitored in the PDCCH search space, the PUSCH is sent to the base station, and the PUSCH feedback indication is received in the PDCCH search space so that the user equipment can stop sending the remaining repetition number of the PUSCH, the non-terrestrial networks can support the hybrid automatic repeat request acknowledgment function, and the remaining repetition number of the physical uplink shared channel of the user equipment can be stopped in advance, thereby reducing the energy overhead of the user equipment.

FIG. 9 is a flowchart of another feedback information transmission method according to an embodiment of the present application. This embodiment of the present application is an embodiment based on the preceding embodiment of the present application. Referring to FIG. 9, the method according to this embodiment of the present application includes the following:

In S610, the setting parameter of the PDCCH is received.

In S620, the dedicated uplink resource grant or the dedicated downlink resource grant is monitored through the PDCCH search space.

In S630, a discontinuous transmission parameter (DTX) is received.

The discontinuous transmission parameter (DTX) may be a gap that controls the PUSCH to discontinuously perform repeated transmissions, the gap after each repeated transmission of the PUSCH may be determined by the DTX, and the DTX may be sent by the base station to the UE together with the setting parameter and may also be sent alone to the UE by the base station.

For example, the user equipment may receive the DTX configured by the base station, and the DTX is used for the repeated transmissions of the PUSCH.

In S640, the repeated transmissions of the PUSCH are performed according to the DTX, and a PUSCH feedback indication is monitored through the PDCCH search space.

In this embodiment of the present application, the UE sends the PUSCH according to the configured DTX so that the UE may acquire the feedback information from the base station before sending of all the number of repetitions of the PUSCH is completed, thereby reducing the sending power consumption of the UE. For example, when the PUSCH is repeatedly transmitted n times, then the length of the DTX is spaced, and when the PUSCH is repeatedly sent n times again, the length of the DTX is spaced again. The entire sending process of the PUSCH may repeat the preceding process. After each repeated transmission of the PUSCH, the PUSCH feedback indication may be monitored in the search space corresponding to the PDCCH.

In S650, in response to receiving the PUSCH feedback indication, sending of the remaining repetition number of the PUSCH is stopped.

In an embodiment, based on the preceding embodiments of the present application, the DTX includes at least one of the following: the number of times of each repeated transmission of the PUSCH of the UE, the division number of repeated transmissions of the PUSCH of the UE, or the length of the DTX.

FIG. 10 is a flowchart of another feedback information transmission method according to an embodiment of the present application. This embodiment of the present application is an embodiment based on the preceding embodiments of the present application. Referring to FIG. 10, the method according to this embodiment of the present application includes the following:

In S710, the setting parameter of the PDCCH is received.

In S720, the dedicated uplink resource grant or the dedicated downlink resource grant is monitored through the PDCCH search space.

In S730, a second PDCCH monitoring gap of the PDCCH search space is received.

The second PDCCH monitoring gap may be a gap between the time when the UE sends the PUSCH and the time when the UE receives the PDCCH.

In this embodiment of the present application, the UE may acquire the sent second PDCCH monitoring gap which may be used for receiving the feedback information of the base station.

In S740, a PUSCH is sent to the base station, and a PUSCH feedback indication is monitored after the second PDCCH monitoring gap of the PDCCH search space.

In this embodiment of the present application, the user equipment transmits the PUSCH to the base station and monitors the PUSCH feedback indication at the position after the second PDCCH monitoring gap in the PDCCH search space.

In S750, in response to receiving the PUSCH feedback indication, sending of the remaining repetition number of the PUSCH is stopped.

In this embodiment of the present application, after each repeated transmission of the PUSCH, the PUSCH feedback indication sent by the base station is received after the second PDCCH monitoring gap, and if the PUSCH feedback indication is received, sending of the remaining repetition number of the PUSCH to the base station is stopped. The configuration of the second PDCCH monitoring gap can reduce the presence of the case in which the UE cannot acquire the feedback from the base station in time due to an excessively large configured first PDCCH monitoring gap.

In an embodiment, based on the preceding embodiments of the present application, the second PDCCH monitoring gap has the same time-domain start position as a first PDCCH monitoring gap of the PDCCH search space and is less than the first PDCCH monitoring gap.

In an embodiment, based on the preceding embodiments of the present application, the first PDCCH monitoring gap is an integer multiple of the second PDCCH monitoring gap.

FIG. 11 is a flowchart of another feedback information transmission method according to an embodiment of the present application. This embodiment of the present application is an embodiment based on the preceding embodiments of the present application. Referring to FIG. 11, the method according to this embodiment of the present application includes the following:

In S810, the setting parameter of the PDCCH is received.

In S820, the dedicated uplink resource grant or the dedicated downlink resource grant is monitored through the PDCCH search space.

In S830, a PDCCH receiving occasion is received.

The PDCCH receiving occasion may be an occasion at which the UE receives the feedback information of the base station, and the PDCCH receiving occasion may be determined by the base station according to the occasion at which the PUSCH is received. For example, the PDCCH receiving occasion may also be predefined by the specification, and the base station determines the PDCCH occasion based on the predefined rules in the specification. The PDCCH receiving occasion may be targeted at each repeated transmission of the PUSCH or the entire transmission of the PUSCH.

In this embodiment of the present application, the UE may receive the PDCCH receiving occasion, and the PDCCH receiving occasion may be sent separately from the setting parameter of the PDCCH search space and may also be sent simultaneously with the setting parameter of the PDCCH search space.

In S840, a PUSCH is sent to the base station, and a PUSCH feedback indication is monitored at the PDCCH receiving occasion in the PDCCH search space.

For example, the user equipment sends the PUSCH to the base station in a repeated transmission manner, and monitors the PUSCH feedback indication sent by the base station according to the PDCCH receiving occasion in the PDCCH search space after the PUSCH is sent.

In S850, in response to receiving the PUSCH feedback indication, sending of the remaining repetition number of the PUSCH is stopped.

In an embodiment, based on the preceding embodiments of the present application, the PDCCH receiving occasion is a position which is offset backward by a threshold time length from the end position of the continuous repeated transmission of the PUSCH of the UE.

In an embodiment, based on the preceding embodiments of the present application, the PDCCH receiving occasion is a position which is offset backward by a time length of a hybrid automatic repeat request round-trip time (such as UL HARQ RTT) timer from the end position of the continuous repeated transmission of the PUSCH of the UE.

Figure 12:
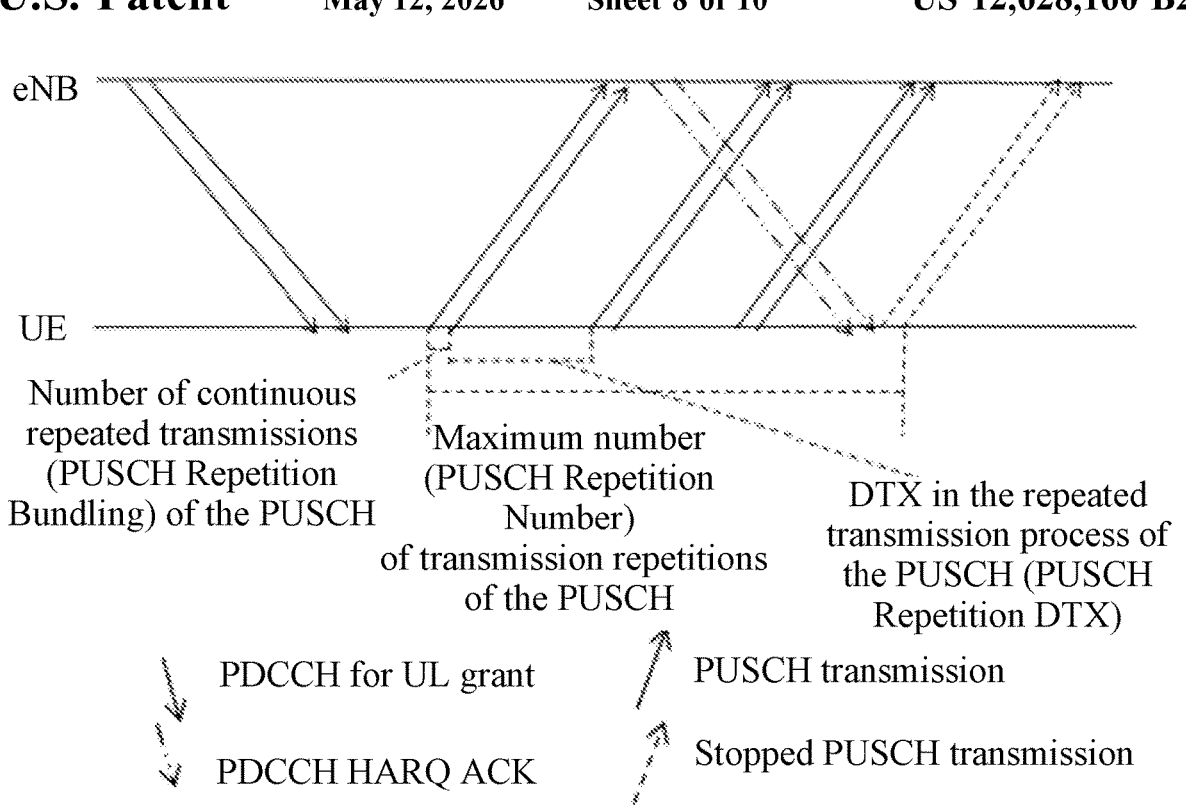
FIG. 12 is an example diagram illustrating a feedback information transmission method according to an embodiment of the present application.

In an exemplary embodiment, the process of the feedback transmission method in which the repeated transmissions of the PUSCH are divided and sent by use of the DTX may be as shown in FIG. 12. Referring to FIG. 12, a PUSCH Repetition DTX is introduced in the repeated transmission process (PUSCH Repetition Number) of the PUSCH, when the PUSCH is transmitted n times (PUSCH Repetition bundling), the length of the PUSCH Repetition DTX is spaced, and when the PUSCH is repeatedly transmitted n times (PUSCH Repetition bundling) again, the length of the PUSCH Repetition DTX is spaced again, and so on, until the number of transmission repetitions of the PUSCH reaches the maximum number (PUSCH Repetition Number) of the transmission repetitions of the PUSCH.

The PUSCH Repetition DTX is configured by the base station or predefined, for example, the PUSCH Repetition DTX is equal to the round-trip time (RTT).

The value of the PUSCH Repetition in the PUSCH Repetition bundling may only be an integer factor of the PUSCH Repetition Number, which is similar to selecting a value in a candidate set R decoded by a PDCCH UE-specific search space (USS), and the value of the PUSCH Repetition is configured by the base station (which directly configures the number of repetitions corresponding to the PUSCH Repetition bundling, or configures the number of PUSCH repetition bundlings into which the PUSCH is divided by the DTX).

For example, the times of PUSCH Repetitions in the PUSCH Repetition bundling may be defined with reference to the following candidate set decoded by the PDCCH USS.

| $R_{max}$ | R |
|---|---|
| 1 | 1 |
| 2 | 1 |
|  | 2 |
| 4 | 1 |
|  | 2 |
|  | 4 |
| >=8 | $R_{max}/8$ |
|  | $R_{max}/4$ |
|  | $R_{max}/2$ |
|  | $R_{max}$ |

In an exemplary embodiment, the value of the PUSCH Repetition Number may be taken from $R_{max}$. $R_{max}$ denotes the maximum number of transmission repetitions of the PUSCH.

Figure 13:
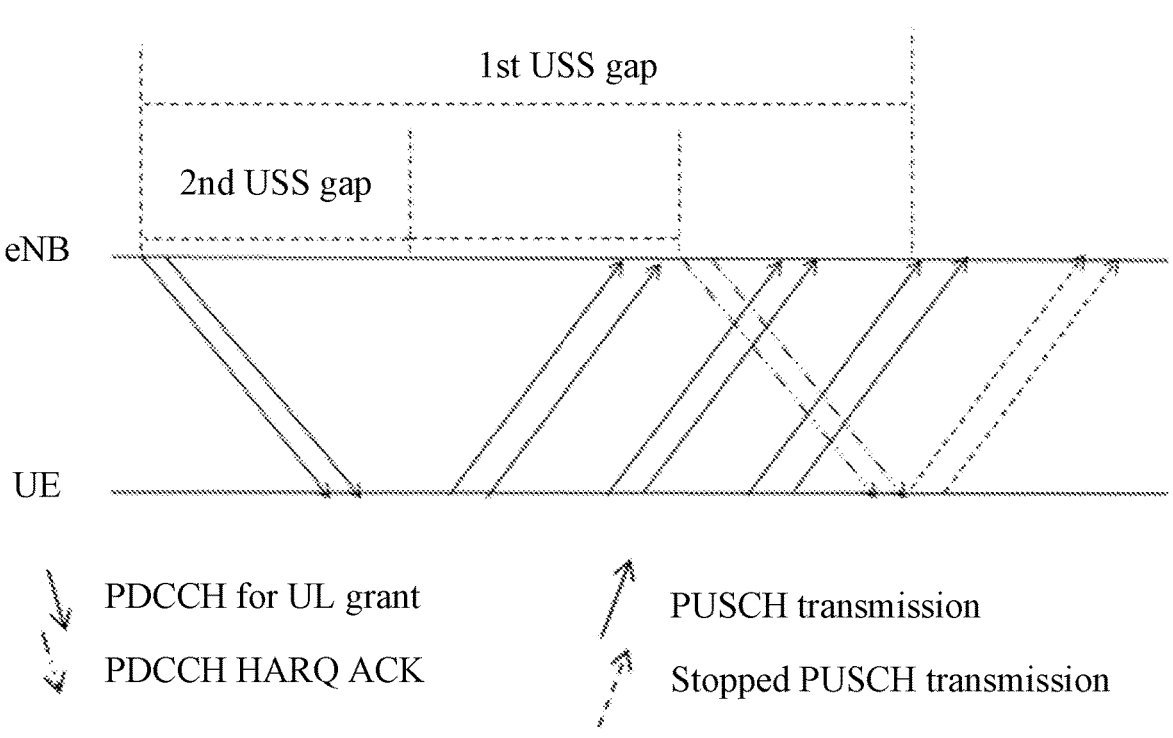
FIG. 13 is an example diagram illustrating a feedback information transmission method according to an embodiment of the present application.

In an exemplary embodiment, the feedback information transmission method in which the second PDCCH monitoring gap (USS GAP) is configured for the UE may be as shown in FIG. 13. Referring to FIG. 13, from the time which is offset backward by the UL HARQ RTT Timer after sending of the repeated transmissions of the PUSCH starts or after the transmission of the first PUSCH Repetition bundling is completed, the UE starts to monitor the PDCCH according to the second USS GAP until the transmission of the PUSCH ends or until the UE receives the PDCCH HARQ ACK, and then the UE starts to monitor the PDCCH according to the first USS GAP. The first USS GAP has the same start offset (start position) as the second USS GAP, and the length of the PDCCH GAP of the first USS GAP is an integer multiple of the length of the PDCCH GAP of the second USS GAP.

Figure 14:
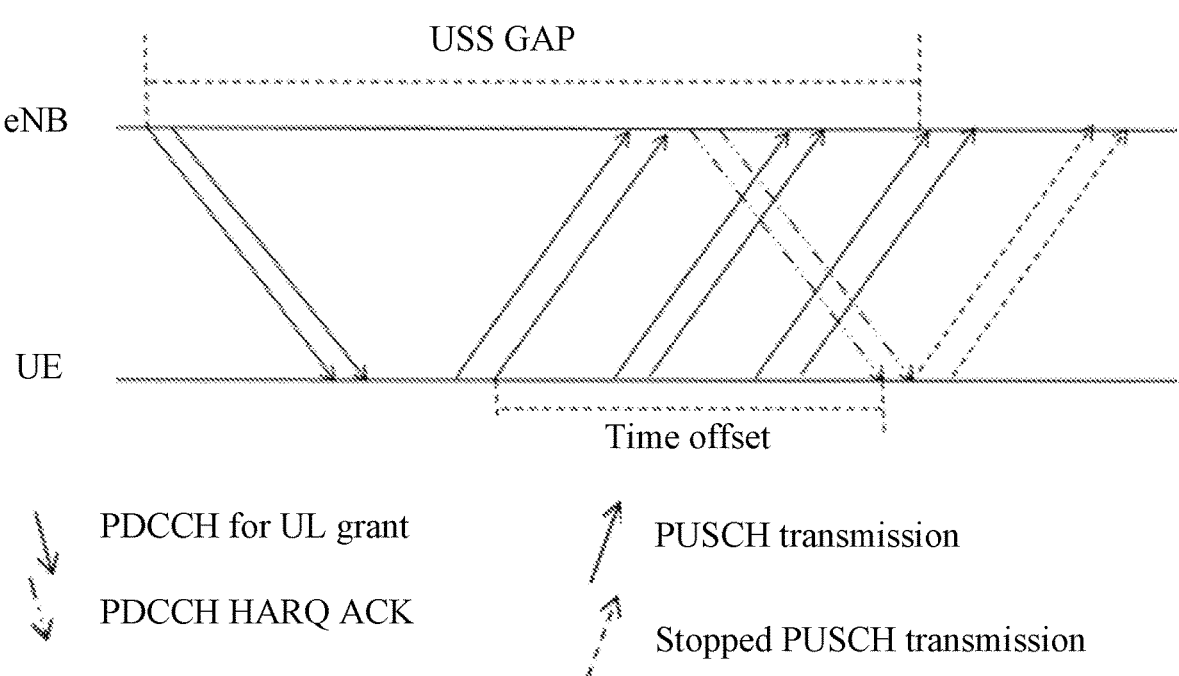
FIG. 14 is an example diagram illustrating a feedback information transmission method according to an embodiment of the present application.

In another exemplary embodiment in which a receiving occasion for the PDCCH HARQ ACK is configured for the UE in a feedback information transmission process, referring to FIG. 14, before the transmission of the number of repetitions of the PUSCH ends, the UE starts to monitor a dedicated PDCCH at the time which is offset backward by the time offset (timeOffset) after transmission of each PUSCH Repetition bundling ends. The number of repetitions of the PDCCH is the same as the number of repetitions of the USS PDCCH, or the base station explicitly configures the number of repetitions of the PDCCH used for the PDCCH HARQ ACK (the base station configures the number of repetitions of the PDCCH used for the PDCCH HARQ ACK and sends the number of repetitions to the UE). The time offset may be the UL HARQ RTT Timer, or the base station explicitly configures the length of one timer.

The preceding may be equivalent to configuring the second USS GAP for the UE, the start position of the second USS GAP is located at the position which is offset backward by the time offset after the transmission of the PUSCH repetition bundling ends, and the PDCCH GAP of the second USS GAP is equal to PUSCH Repetition DTX+UL HARQ RTT Timer.

Figure 15:
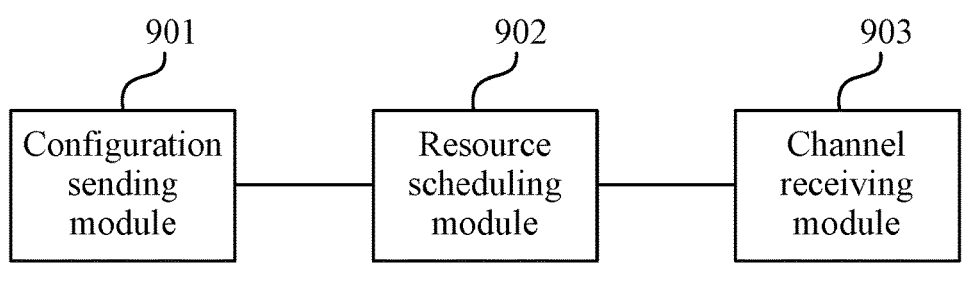
FIG. 15 is a diagram illustrating the structure of a feedback information transmission apparatus according to an embodiment of the present application.

FIG. 15 is a diagram illustrating the structure of a feedback information transmission apparatus according to an embodiment of the present application. The apparatus may perform the feedback information transmission method according to any embodiment of the present application and may execute the corresponding functional modules and effects of the method. The apparatus is implementable by software and/or hardware and includes a configuration sending module 901, a resource scheduling module 902 and a channel receiving module 903.

The configuration sending module 901 is configured to send a setting parameter of a physical downlink control channel (PDCCH) search space.

The resource scheduling module 902 is configured to send a scheduled dedicated uplink resource grant or a scheduled dedicated downlink resource grant through the PDCCH search space.

The channel receiving module 903 is configured to, in response to receiving a physical uplink shared channel (PUSCH) of a user equipment (UE), send a PUSCH feedback indication to the UE through the PDCCH search space so that the UE may stop sending the remaining repetition number of the PUSCH.

In this embodiment of the present application, the configuration sending module sends the setting parameter of the PDCCH search space to the UE, the resource scheduling module sends the scheduled dedicated uplink resource grant or the scheduled dedicated downlink resource grant in the PDCCH search space, and when receiving the PUSCH, the channel receiving module sends the PUSCH feedback indication to the user equipment through the PDCCH search space so that the user equipment may stop sending the remaining repetition number of the PUSCH, the non-terrestrial networks can support the hybrid automatic repeat request acknowledgment function, and the remaining repetition number of the physical uplink shared channel of the user equipment can be stopped in advance, thereby reducing the energy overhead of the user equipment.

In an embodiment, based on the preceding embodiment of the present application, the apparatus further includes a parameter sending module.

The parameter sending module is configured to send a discontinuous transmission parameter (DTX) so that the UE may send the repeated transmissions of the PUSCH according to the DTX.

In an embodiment, based on the preceding embodiment of the present application, the DTX in the parameter sending module includes at least one of the following: the number of times of each repeated transmission of the PUSCH of the UE, the division number of repeated transmissions of the PUSCH of the UE, or the length of the DTX.

In an embodiment, based on the preceding embodiments of the present application, the apparatus further includes a gap receiving module.

The gap receiving module is configured to send a second PDCCH monitoring gap of the PDCCH search space so that according to the second PDCCH monitoring gap, the UE may receive the PUSCH feedback indication and stop sending the remaining repetition number of the PUSCH.

In an embodiment, based on the preceding embodiments of the present application, the second PDCCH monitoring gap in the gap receiving module has the same time-domain start position as a first PDCCH monitoring gap of the PDCCH search space and is less than the first PDCCH monitoring gap.

In an embodiment, based on the preceding embodiments of the present application, the first PDCCH monitoring gap in the gap receiving module is an integer multiple of the second PDCCH monitoring gap.

In an embodiment, based on the preceding embodiments of the present application, the apparatus further includes an occasion receiving module.

The occasion receiving module is configured to send a PDCCH receiving occasion so that the UE may receive the PUSCH feedback indication according to the PDCCH receiving occasion and stop sending the remaining repetition number of the PUSCH.

In an embodiment, based on the preceding embodiments of the present application, the PDCCH receiving occasion in the occasion receiving module is a position which is offset backward by a threshold time length from the end position of the continuous repeated transmission of the PUSCH of the UE.

In an embodiment, based on the preceding embodiments of the present application, the PDCCH receiving occasion in the occasion receiving module is a position which is offset backward by a time length of a hybrid automatic repeat request round-trip time (HARQ RTD) timer from the end position of the continuous repeated transmission of the PUSCH of the UE.

Figure 16:
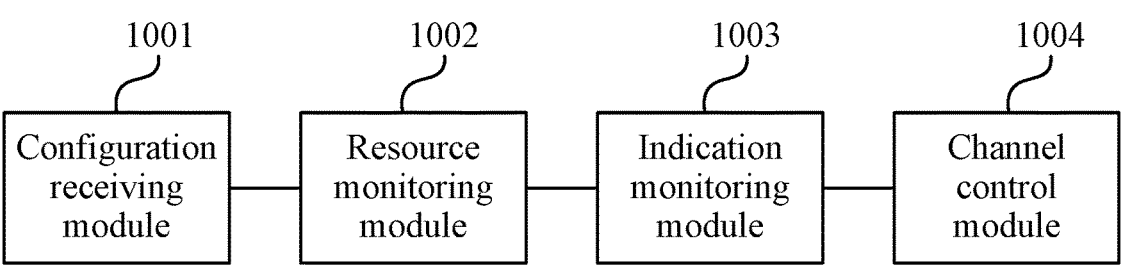
FIG. 16 is a diagram illustrating the structure of another feedback information transmission apparatus according to an embodiment of the present application.

FIG. 16 is a diagram illustrating the structure of another feedback information transmission apparatus according to an embodiment of the present application. The apparatus may perform the feedback information transmission method according to any embodiment of the present application and may execute the corresponding functional modules and effects of the method. The apparatus is implementable by software and/or hardware and includes a configuration receiving module 1001, a resource monitoring module 1002, an indication monitoring module 1003 and a channel control module 1004.

The configuration receiving module 1001 is configured to receive a setting parameter of a physical downlink control channel (PDCCH) search space.

The resource monitoring module 1002 is configured to monitor a dedicated uplink resource grant or a dedicated downlink resource grant through the PDCCH search space.

The indication monitoring module 1003 is configured to send a physical uplink shared channel (PUSCH) to a base station, and monitor a PUSCH feedback indication through the PDCCH search space.

The channel control module 1004 is configured to, in response to receiving the PUSCH feedback indication, stop sending the remaining repetition number of PUSCH.

In this embodiment of the present application, the configuration receiving module receives the setting parameter of the PDCCH search space sent by the base station, the resource monitoring module monitors the dedicated uplink resource grant or the dedicated downlink resource grant in the PDCCH search space, the indication monitoring module sends the PUSCH to the base station and receives the PUSCH feedback indication in the PDCCH search space, and the channel control module enables the user equipment to stop sending the remaining repetition number of the PUSCH, the non-terrestrial networks can support the hybrid automatic repeat request acknowledgment function and the remaining repetition number of the physical uplink shared channel of the user equipment can be stopped in advance, thereby reducing the energy overhead of the user equipment.

In an embodiment, based on the preceding embodiment of the present application, the apparatus further includes a sent parameter receiving module.

The sent parameter receiving module is configured to receive a discontinuous transmission parameter (DTX).

In an embodiment, based on the preceding embodiments of the present application, the indication monitoring module 1003 includes a sending control unit.

The sending control unit is configured to perform repeated transmissions of the PUSCH according to the DTX.

In an embodiment, based on the preceding embodiments of the present application, the DTX in the sent parameter receiving module includes at least one of the following: the number of times of each repeated transmission of the PUSCH of the UE, the division number of repeated transmissions of the PUSCH of the UE, or the length of the DTX.

In an embodiment, based on the preceding embodiments of the present application, the apparatus further includes a gap configuration receiving module.

The gap configuration receiving module is configured to receive a second PDCCH monitoring gap of the PDCCH search space.

In an embodiment, based on the preceding embodiments of the present application, the indication monitoring module 1003 includes a first feedback receiving unit.

The first feedback receiving unit is configured to monitor the PUSCH feedback indication according to the second PDCCH monitoring gap of the PDCCH search space.

In an embodiment, based on the preceding embodiments of the present application, the second PDCCH monitoring gap in the gap configuration receiving module has the same time-domain start position as a first PDCCH monitoring gap of the PDCCH search space and is less than the first PDCCH monitoring gap.

In an embodiment, based on the preceding embodiments of the present application, the first PDCCH monitoring gap in the gap configuration receiving module is an integer multiple of the second PDCCH monitoring gap.

In an embodiment, based on the preceding embodiments of the present application, the apparatus further includes an occasion configuration receiving module.

The occasion configuration receiving module is configured to receive a PDCCH receiving occasion.

In an embodiment, based on the preceding embodiments of the present application, the indication monitoring module 1003 includes a second feedback receiving unit.

The second feedback receiving unit is configured to monitor the PUSCH feedback indication at the PDCCH receiving occasion in the PDCCH search space.

In an embodiment, based on the preceding embodiments of the present application, the PDCCH receiving occasion in the occasion configuration receiving module is a position which is offset backward by a threshold time length from the end position of the continuous repeated transmission of the PUSCH of the UE.

In an embodiment, based on the preceding embodiments of the present application, the PDCCH receiving occasion in the occasion configuration receiving module is a position which is offset backward by a time length of a hybrid automatic repeat request round-trip time (HARQ RTD) timer from the end position of the continuous repeated transmission of the PUSCH of the UE.

Figure 17:
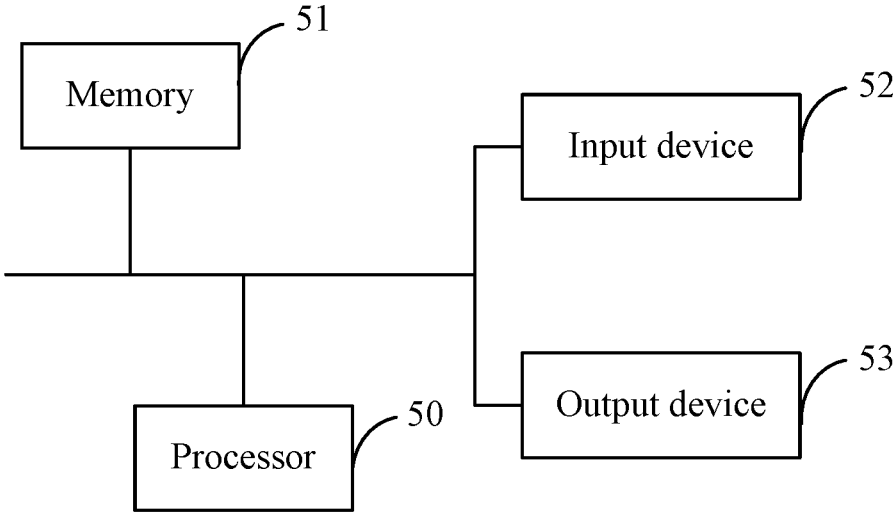
FIG. 17 is a diagram illustrating the structure of a base station according to an embodiment of the present application.

FIG. 17 is a diagram illustrating the structure of a base station according to an embodiment of the present application. The base station includes a processor 50, a memory 51, an input device 52 and an output device 53. One or more processors 50 may be provided in the base station. One processor 50 is shown as an example in FIG. 17. The processor 50, the memory 51, the input device 52 and the output device 53 in the base station may be connected via a bus or in other manners. The connection via a bus is shown as an example in FIG. 17.

As a computer-readable storage medium, the memory 51 may be configured to store software programs, computer executable programs and modules such as the modules (the configuration sending module 901, the resource scheduling module 902 and the channel receiving module 903) corresponding to the feedback information transmission apparatus in embodiments of the present application. The processor 50 runs the software programs, instructions and modules stored in the memory 51 to execute function applications and data processing of the base station, that is, to perform the preceding feedback information transmission method.

The memory 51 may mainly include a program storage region and a data storage region. The program storage region may store an operating system and an application program required for at least one function, and the data storage region may store data or the like created according to the use of the base station. Additionally, the memory 51 may include a high-speed random-access memory and may also include a nonvolatile memory such as at least one disk memory, a flash memory, or another nonvolatile solid-state memory. In some examples, the memory 51 may further include memories located remotely relative to the processor 50, and these remote memories may be connected to the base station via a network. Examples of the preceding network include, but are not limited to, the Internet, an intranet, a local area network, a mobile communication network and a combination thereof.

The input device 52 may be configured to receive inputted digital or character information and generate key signal input related to the user setting and function control of the base station. The output device 53 may include display devices such as a display screen.

Figure 18:
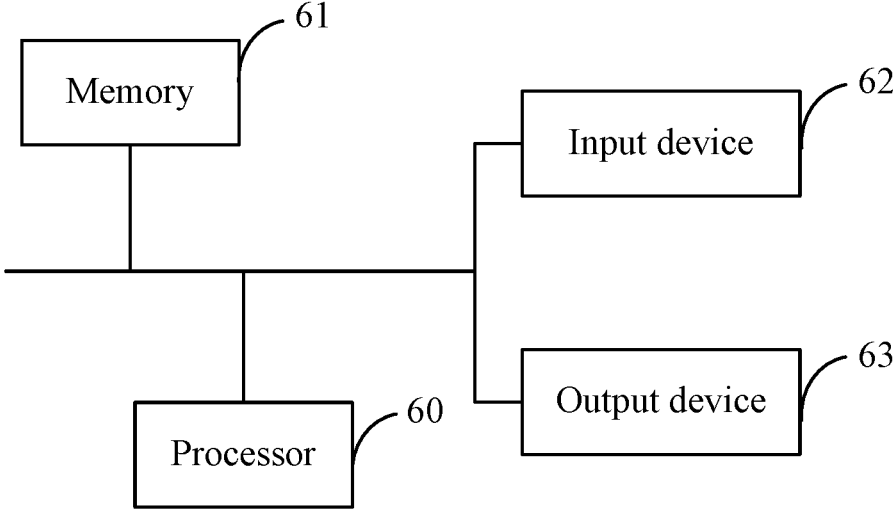
FIG. 18 is a diagram illustrating the structure of a user equipment according to an embodiment of the present application.

FIG. 18 is a diagram illustrating the structure of a user equipment according to an embodiment of the present application. The user equipment includes a processor 60, a memory 61, an input device 62 and an output device 63. One or more processors 60 may be provided in the user equipment. One processor 60 is shown as an example in FIG. 18. The processor 60, the memory 61, the input device 62 and the output device 63 in the user equipment may be connected via a bus or in other manners. The connection via a bus is shown as an example in FIG. 18.

As a computer-readable storage medium, the memory 61 may be configured to store software programs, computer executable programs and modules such as the modules (the configuration receiving module 1001, the resource monitoring module 1002, the indication monitoring module 1003 and the channel control module 1004) corresponding to the feedback information transmission apparatus in embodiments of the present application. The processor 60 runs the software programs, instructions and modules stored in the memory 61 to execute function applications and data processing of the user equipment, that is, to perform the preceding feedback information transmission method.

The memory 61 may mainly include a program storage region and a data storage region. The program storage region may store an operating system and an application program required by at least one function. The data storage region may store data created according to the use of the user equipment. Additionally, the memory 61 may include a high-speed random-access memory and may also include a nonvolatile memory such as at least one disk memory, a flash memory, or another nonvolatile solid-state memory. In some examples, the memory 61 may further include memories located remotely relative to the processor 60, and these remote memories may be connected to the base station via a network. Examples of the preceding network include, but are not limited to, the Internet, an intranet, a local area network, a mobile communication network and a combination thereof.

The input device 62 may be configured to receive inputted digital or character information and generate key signal input related to the user setting and function control of the user equipment. The output device 63 may include display devices such as a display screen.

Embodiments of the present application further provide a storage medium including computer-executable instructions which, when executed by a computer processor, are configured to perform a feedback information transmission method. The method includes the following:

A setting parameter of a PDCCH search space is sent.

A scheduled dedicated uplink resource grant or a scheduled dedicated downlink resource grant is sent through the PDCCH search space.

In response to receiving a PUSCH of a UE, a PUSCH feedback indication is sent to the UE through the PDCCH search space so that the UE can stop sending the remaining repetition number of the PUSCH.

Alternatively, the method includes the following:

A setting parameter of a PDCCH search space is received.

A dedicated uplink resource grant or a dedicated downlink resource grant is monitored through the PDCCH search space.

A PUSCH is sent to a base station, and a PUSCH feedback indication is monitored through the PDCCH search space.

In response to receiving the PUSCH feedback indication, sending of the remaining repetition number of the PUSCH is stopped.

Through the preceding description of the embodiments, it is clear to those skilled in the art that the embodiments of the present application may be accomplished through software plus necessary universal hardware or through hardware, but in many cases, the former implementation is preferred. Based on this understanding, the technical solutions of the present application substantially, or the part contributing to the related art, may be embodied in the form of a software product. The computer software product may be stored in a computer-readable storage medium such as a floppy disk, a read-only memory (ROM), a random-access memory (RAM), a flash memory, a hard disk, or an optical disk of a computer and includes several instructions for causing a computer device (which may be a personal computer, a server, or a network device) to perform the method in the embodiments of the present application.

It is to be noted that units and modules involved in the embodiments of the feedback information transmission apparatus are just divided according to functional logic, and the division is not limited to this, as long as the corresponding functions can be achieved. Additionally, the specific names of functional units are just intended for distinguishing and are not to limit the scope of the present application.

It is to be understood by those of ordinary skill in the art that some or all steps of the preceding method and function modules/units in the preceding system or device may be implemented as software, firmware, hardware and suitable combinations thereof.

In the hardware implementation, the division of the preceding function modules/units may not correspond to the division of physical components. For example, one physical component may have multiple functions, or one function or step may be executed jointly by several physical components. Some or all physical components may be implemented as software executed by a processor, such as a central processing unit, a digital signal processor, or a microprocessor, or may be implemented as hardware, or may be implemented as an integrated circuit such as an application-specific integrated circuit. Such software may be distributed on computer-readable media. The computer-readable media may include computer storage media (or non-transitory media) and communication media (or transitory media). As known to those of ordinary skill in the art, the term computer storage media includes volatile and non-volatile as well as removable and non-removable media implemented in any method or technology for storing information (such as computer-readable instructions, data structures, program modules, or other data). The computer storage medium includes, but is not limited to, a random access memory (RAM), a read-only memory (ROM), an electrically erasable programmable read-only memory (EEPROM), a flash memory, or other memory technologies, a compact disc read-only memory (CD-ROM), a digital versatile disc (DVD) or other optical disc storage, a magnetic cassette, a magnetic tape, disk storage or other magnetic storage devices, or any other medium used for storing desired information and accessible by a computer. Moreover, as known to those of ordinary skill in the art, the communication media generally include computer-readable instructions, data structures, program modules, or other data in carriers or in modulated data signals transported in other transport mechanisms and may include any information delivery medium.

The preceding alternative embodiments of the present application are described with reference to the drawings and are not intended to limit the scope of the claims of the present application. Any modifications, equivalent replacements and improvements made by those skilled in the art without departing from the scope and substantive content of the present application should be within the scope of the appended claims.

What is claimed is:

1. A feedback information transmission method, applied to a base station of a non-terrestrial network and comprising:

sending a setting parameter of a physical downlink control channel (PDCCH) search space;

sending a scheduled dedicated uplink resource grant or a scheduled dedicated downlink resource grant through the PDCCH search space; and in response to receiving a physical uplink shared channel (PUSCH) of a user equipment (UE), sending a PUSCH feedback indication to the UE through the PDCCH search space to enable the UE to stop sending a remaining repetition number of the PUSCH;

wherein the method further comprises: sending a discontinuous transmission (DTX) parameter to enable the UE to send repeated transmissions of the PUSCH according to the DTX parameter;

wherein the DTX parameter comprises:

a number of times of each repeated transmission of the PUSCH of the UE, and a DTX length; or a division number of the repeated transmissions of the PUSCH of the UE, and the DTX length; and wherein the DTX length refers to a gap that controls discontinuous performance of the repeated transmissions of the PUSCH.

2. The method according to claim 1, further comprising:

sending a second PDCCH monitoring gap of the PDCCH search space to enable the UE to receive the PUSCH feedback indication according to the second PDCCH monitoring gap and stop sending the remaining repetition number of the PUSCH.

3. The method according to claim 2, wherein the second PDCCH monitoring gap has a same time-domain start position as a first PDCCH monitoring gap of the PDCCH search space and is less than the first PDCCH monitoring gap;

wherein the first PDCCH monitoring gap is an integer multiple of the second PDCCH monitoring gap.

4. The method according to claim 1, further comprising:

sending a PDCCH receiving occasion to enable the UE to receive the PUSCH feedback indication according to the PDCCH receiving occasion and stop sending the remaining repetition number of the PUSCH.

5. The method according to claim 4, wherein the PDCCH receiving occasion is located at a position which is offset backward by a threshold time length from an end position of a continuous repeated transmission of the PUSCH of the UE; or wherein the PDCCH receiving occasion is located at a position which is offset backward by a time length of a hybrid automatic repeat request round-trip time (HARQ RTT) timer from an end position of a continuous repeated transmission of the PUSCH of the UE.

6. A feedback information transmission method, applied to a user equipment of a non-terrestrial network and comprising:

receiving a setting parameter of a physical downlink control channel (PDCCH) search space;

monitoring a dedicated uplink resource grant or a dedicated downlink resource grant through the PDCCH search space;

sending a physical uplink shared channel (PUSCH) to a base station, and monitoring a PUSCH feedback indication through the PDCCH search space; and in response to receiving the PUSCH feedback indication, stopping sending a remaining repetition number of the PUSCH;

wherein the method further comprises: receiving a discontinuous transmission (DTX) parameter;

wherein sending the PUSCH to the base station comprises: performing repeated transmissions of the PUSCH according to the DTX parameter;

wherein the DTX parameter comprises:

a number of times of each repeated transmission of the PUSCH of the UE, and a DTX length; or a division number of the repeated transmissions of the PUSCH of the UE, and the DTX length; and wherein the DTX length refers to a gap that controls discontinuous performance of the repeated transmissions of the PUSCH.

7. The method according to claim 6, further comprising:

receiving a second PDCCH monitoring gap of the PDCCH search space.

8. The method according to claim 7, wherein monitoring the PUSCH feedback indication through the PDCCH search space comprises:

monitoring the PUSCH feedback indication after the second PDCCH monitoring gap of the PDCCH search space.

9. The method according to claim 7, wherein the second PDCCH monitoring gap has a same time-domain start position as a first PDCCH monitoring gap of the PDCCH search space and is less than the first PDCCH monitoring gap;

wherein the first PDCCH monitoring gap is an integer multiple of the second PDCCH monitoring gap.

10. The method according to claim 6, further comprising:

receiving a PDCCH receiving occasion.

11. The method according to claim 10, wherein monitoring the PUSCH feedback indication through the PDCCH search space comprises:

monitoring the PUSCH feedback indication at the PDCCH receiving occasion in the PDCCH search space;

wherein the PDCCH receiving occasion is located at a position which is offset backward by a threshold time length from an end position of a continuous repeated transmission of the PUSCH of the UE; or wherein the PDCCH receiving occasion is located at a position which is offset backward by a time length of a hybrid automatic repeat request round-trip time (HARQ RTD) timer from an end position of a continuous repeated transmission of the PUSCH of the UE.

12. A base station, comprising:

at least one processor; and a memory configured to store at least one program, wherein when executed by the at least one processor, the at least one program causes the at least one processor to perform the feedback information transmission method according to claim 1.

13. A user equipment, comprising:

at least one processor; and a memory configured to store at least one program, wherein when executed by the at least one processor, the at least one program causes the at least one processor to perform the feedback information transmission method according to claim 6.

14. A non-transitory computer-readable storage medium storing a computer program which, when executed by a processor, causes the processor to perform the feedback information transmission method according to claim 1.

* * * * *